United States Patent Office 3,068,550
Patented Dec. 18, 1962

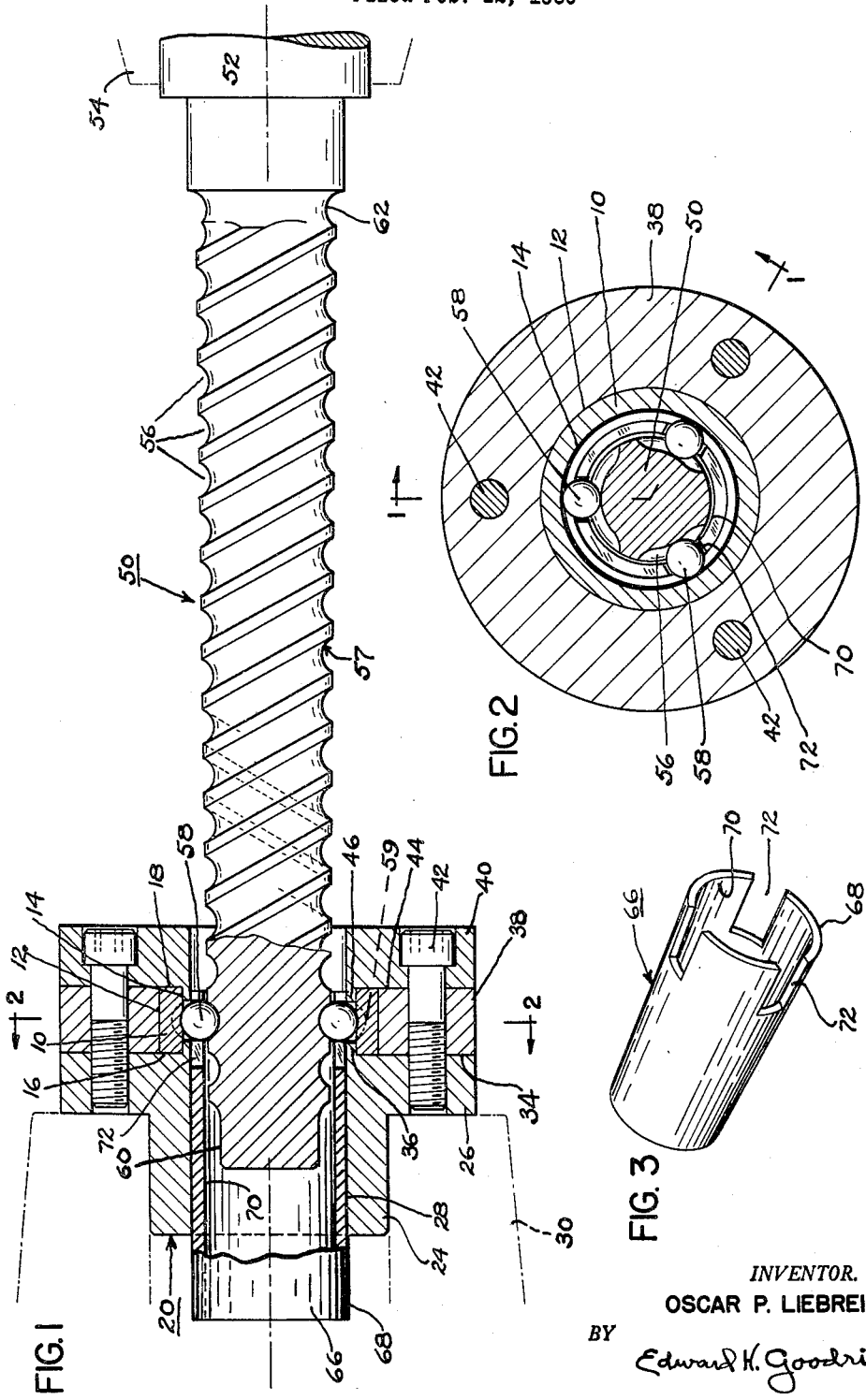

3,068,550
METHOD AND MECHANISM FOR FORMING ANNULAR GROOVES
Oscar P. Liebreich, Waterbury, Conn., assignor to General Motors Corporation, Detroit, Mich., a corporation of Delaware
Filed Feb. 12, 1960, Ser. No. 8,403
10 Claims. (Cl. 29—148.4)

This invention relates to a method and mechanism for forming annular grooves and more particularly to an improved method and apparatus for forming the annular raceway in the race ring of an antifriction bearing.

Antifriction bearings and particularly ball bearings which are designed to rotate at high speeds under appreciable load, are expensive and difficult to manufacture in view of the very high precision required. The raceways as well as the balls must be made extremely smooth and within very close limits of accuracy. Consequently, the raceways have to be carefully machined and then subjected to precision grinding operations which are usually followed by honing or lapping operations to lie within exacting tolerances which may be as small as one ten-thousandth of an inch or even less. These exacting and slow manufacturing operations require expensive precision machinery operated by highly skilled individuals. Even with such close accuracies in the different bearing parts, slight accumulative errors occur which frequently are sufficient to make the bearing unacceptable. It is generally recognized that the greatest error in a ball bearing usually occurs in the annular raceway which is ground within the inner face of the outer race ring. Due to space limitations, the grinding of this radially inwardly facing outer raceway has to be undertaken with a small diameter grinding wheel whose size is limited by the bore of the outer race ring. This grinding wheel necessarily has to be mounted on a small diameter shaft or quill which is rotated at very high speeds to provide the required grinding action. Additionally, if this grinding operation is produced by an oscillating grinder, as is usual, there are further space limitations with respect to the size of the grinding wheel and its quill support. A small grinding wheel is subjected to rapid wear and its supporting shaft or quill easily springs with the consequent result that it is very difficult to maintain the precisely required raceway size, smoothness and contour while meeting the demands of high speed production. Consequently, there is much need for an improved mechanism and method for accurately and consistently forming an accurate raceway within an outer race ring and which will meet the demands of high speed production.

It is, therefore, an object of this invention to provide an improved mechanism and method for precisely forming an annular groove in a bearing member.

A further object of my invention is to provide an improved mechanism and method for making an antifriction bearing race ring and which eliminates the forming of a raceway therein by a grinding operation.

A further object of my invention is to provide an improved method for making the outer race ring of a bearing and wherein an annular raceway or groove is formed therein by a roll-forming operation.

A still further object of this invention is to provide a method and mechanism for forming an annular raceway in the outer ring of an antifriction bearing and wherein the metal is deformably compressed to form the raceway with an increased density of the metal at the raceway surface.

To these ends and also to improve generally upon methods and devices of this character, this invention consists in the various matters hereinafter described and claimed. In its broader aspects, the invention is not necessarily limited to the specific structures and methods illustrated in the accompanying drawings wherein:

FIGURE 1 is a fragmentary cross section taken along the line 1—1 of FIGURE 2 and illustrating the apparatus and method for forming a raceway in an outer race ring;

FIGURE 2 is a cross sectional view taken along the lines 2—2 of FIGURE 1; and

FIGURE 3 is a perspective view of the separator which initially locates the rolling elements.

My improved method and mechanism accurately forms an annular groove as the raceway in the outer race ring of an antifriction bearing by a rolling operation wherein circumferentially spaced rolling elements cooperatively advance and compress the metal of the race ring to form an annular raceway to the precisely required contour and size without resorting to the previously used expensive and time-consuming machining and grinding operations. In addition to saving metal there is provided an increased density of the metal which prestresses this race ring at the raceway thereby greatly increasing the fatigue life of the bearing which includes this ring. This raceway rolling operation is particularly adapted to deformable ferrous alloys and also to non-ferrous alloys such as cobalt alloys which tend to become work-hardened with cold-forming operations. Also, this method and mechanism for producing an accurate raceway in a continuous forming operation eliminates many handling and chucking operations which were previously necessary during the machining and grinding of race rings.

As illustrated, a bearing outer race ring 10 is initially formed as an annular member of required radial wall thickness and having coaxial inner and outer cylindrical walls 12 and 14 extending between parallel radial end walls 16 and 18. This race ring is preferably composed of a metal which will shape while cold under heavy rolling pressures and which will work harden at the surface being deformed. However, it is not necessarily intended that my method and mechanism be limited to materials which will increase in hardness due to cold working operations. Many ferrous materials, and particularly certain steels, may be subjected to various surface treatments as cyaniding or carburizing and then have annular raceways formed therein to the precisely required contour and size by a rolling operation after which a suitably applied heat treatment, as a controlled localized induction heating, may be employed to finally harden the metal at and adjacent to the raceway.

A chuck generally indicated at 20 has an annular body provided with a rearwardly directed tubular extension 24 and an annular flange 26. The chuck has an axially extending through bore 28. The tubular extension 24 is tightly and coaxially fitted within the bore of a rotatable work head 30 and the flange 26 locates against the outer end of this work head which may be a lathe headstock or other suitable support that will rotatably drive the chuck 20 about its axis. The forward end of the chuck portion 26 has an annular radial face 34 from which axially projects a short annular flange 36 coaxial of the bore 28 and which pilots within the end of the inner cylindrical surface 14 of the race ring 10. A spacer ring 38 having an axial length slightly less than that of the race ring 10, has a central bore slidably fitted over the race ring periphery and has its inner flat end abutting against the end flange face 34.

An annular clamping plate 40, held in place as by cap screws 42, has a central bore coextensive with the bore 28 and has a flat annular inner face 44 clamped against the outer face of the spacer ring 38 and against the flat outer end 18 of the race ring 10. A narrow annular flange 46 axially projecting from the plate 40, slidably fits in piloting relation within the outer end of the race ring 10 in the same manner that the flange 36 fits within the inner end of this race ring. It will thus be appreciated that the chuck confiningly grips the race ring 10 except for an axial length intermediate the bore of this race ring and in which the raceway is to be formed.

A camming member, herein illustrated as a ball feed screw generally indicated at 50, has an enlarged end 52 non-rotatably supported in a holder 54 coaxially of the race ring 10 held within the chuck 20. This may be accomplished by employing the holder 54 as a part of the tailstock of a lathe which non-rotatably supports the feed screw 50 coaxially of the bore 28 and wherein the slidable movement of the tailstock upon its ways provides for a desired axial feed of the screw 50. The ball feed screw 50 has an elongated multiple thread 56, herein illustrated as a triple thread, wherein each thread portion has the same lead and the same gradually increasing root diameter. The transverse curvature of each thread groove arcuately corresponds at 57 to the radius of a hardened ball 58 to be received therein and which rolls the raceway radially inwardly into the inner portion of the race ring 10 as indicated by the dotted lines at 59. The left hand ends of each of these threads 56 at its least root diameter merges with a cylindrical surface 60 on the end of the ball feed screw. The right hand end of each threaded portion of the ball feed screw has the root diameters of its threads 56 merge into an annular groove 62 which is preferably of a correspondingly arcuate contour to that of the raceway forming balls. The ball feed screw between the adjacent thread turns may be of a generally conical shape and corresponding in taper to that of the root diameters of the threads. It will be appreciated that the number of threads in the feed screw corresponds to the number of balls 58. Also, if desired, rotation could be imparted to the feed screw, it only being necessary that relative rotation be provided between the feed screw and chuck to cause the balls to advance along the screw during the raceway forming operation.

A separator 66 may be used to initially locate the hardened balls 58 at the start of the roll-forming operation. This separator is in the form of a sleeve or tubular member having a cylindrical outer surface 68 slidably journalled in the bore 28 and having a bore diameter 70 slightly exceeding the maximum outer diameter of the threaded portion 56 of the feed screw 50 as best shown in FIGURE 1. The separator 66 is provided at its right hand end with a plurality of blind end circumferentially spaced ball-receiving slots 72 which respectively and loosely receive the balls in uniformly circumferentially spaced relation to be picked-up by the start of the ball threads 56. In the illustrated embodiment, the open ended slots 72 are spaced apart through 120° so that each of the rolling balls will be simultaneously picked up from the cylindrical surface 60 by one of the threads 56 of the triple thread screw portion of the ball feed screw. It will be appreciated, of course, that a lesser or greater number of slots 72 may be provided in the member 66 depending upon the number of circumferential spacing of the balls received by the multiple threads 56 in the ball feed screw.

In operation, the hardened steel balls 58 are located between the cylindrical surface 60 and the bore 14 of the race ring 10 and between the opposing axial ends of the annular flanges 36 and 46. The separator 66 is thereafter slid within the bore 28 so that each slot 72 of the separator receives one of the balls 58 to circumferentially space these balls. While the separator is thus located, the chuck 30 is rotated and a slight inward feed is provided for the feed screw 50 sufficient so that each of the balls is respectively picked up in a ball track or thread groove 56 after which the separator 66 may be withdrawn from position although this is not necessary. The following rotation of the chuck 30 and the outer race ring 10 causes the balls 58 to uniformly advance in the respective thread grooves 56 on the feed screw and to be radially and correspondingly forced outwardly into the race rings to cold form therein the annular raceway 59. The axial spacing between the opposed ends of the flanges 36 and 46 closely approximates that of the ball diameters so that the raceway is produced in the desired axial position within the race ring. This rolling operation of the balls to produce the raceway provides a raceway of precisely the desired size and contour which may be carefully controlled by the controlled extent of in-feed of the feed screw at 50. If desired, the final size of the raceway 59 may be determined by continuing the feed until the balls 58 run out into the annular groove 62 of predetermined size. In the event that the balls locate in this groove 62, it has been found desirable to have the separator 66 in ball locating position during the entire rolling operation so that upon reversal of the chuck rotation, the balls will be guided back into the respective grooves 56.

This rolling operation also produces the desirable condition of greatly increasing the density of the metal at the raceway surface thus providing a compacted prestressed condition of the race ring adjacent the raceway and which materially increases the fatigue life of the bearing of which the race ring later becomes a part. At the completion of the roll-forming operation, the chuck 30 is rotated in a reverse direction causing the ball feed screw 50 to rapidly feed out of operating position after which the completed race ring 10 may be removed from the chuck 20.

In certain cobalt alloys and in some ferrous base materials, this cold-forming operation work hardens the metal at the raceways sufficiently to avoid wear and provide for long useful bearing life. However, the bearing race rings may, if desired, be subsequently heat treated for a further hardening of the raceways. Also, I have found it advantageous with some ferrous materials, to initially treat the race ring 10 at its inner cylindrical surface 12 with a cyaniding or carburizing operation after which the rolling operation to form the raceway 59 is produced while the race ring remains in its original relatively soft condition. Following this roll-forming of the raceway 59, a suitable heat treatment may be employed to provide the required hardened condition at the raceway. It has also been found effective to produce a locally hardened condition at the raceway by a controlled induction heating operation on certain ferrous materials after this raceway has been roll-formed.

I claim:

1. In a device for forming an annular groove in a bearing ring having coaxial external and internal circular walls, a rotatable chuck for coaxially supporting said ring, a plurality of circumferentially spaced rolling elements engageable with one of said circular walls, guide flanges on said chuck axially positioning the rolling elements in a plane extending radially through said ring, a camming member coaxial with said chuck and having a plurality of longitudinally tapering tracks axially extending through said ring and respectively engaging the rolling elements and locating said elements against the ring, mechanism providing for relative coaxial rotation between the chuck and the camming member, and means for axially feeding the camming member through said ring during said relative rotation to force the rolling elements into said ring and form an annular groove therein.

2. In a device for forming an annular groove in a bearing ring having coaxial external and internal circular walls, a rotatable chuck for coaxially supporting said ring, a plurality of rolling elements engageable with one of said circular walls, guide flanges on the chuck axially locating the rolling elements within the ring in a plane normal to the ring axis, a rotatable separator circumferentially spacing said rolling elements, a camming member coaxial with the chuck and having spaced longitudinally tapering surfaces of revolution extending through said ring in engagement with the rolling elements and locating said elements against one of said circular walls, mechanism providing relative coaxial rotation between said camming member and said chuck, and longitudinal feeding mechanism for axially feeding said camming member through the ring whereby said rolling elements will roll a groove of predetermined contour in said ring.

3. In a device for forming an annular groove in a bearing ring having coaxial external and internal circular walls, a rotatable chuck for coaxially supporting said ring, a plurality of circumferentially spaced rolling elements engageable with one of said circular walls, guide members on the chuck and projecting within said ring for axially positioning the rolling elements in a radial plane through said ring, a feed screw coaxial with said chuck and longitudinally movable relative to the chuck, threaded portions on the feed screw projecting through the ring and engaging the rolling elements and correspondingly increasing in diameter longitudinally of said screw, and means providing relative rotation between the chuck and the feed screw whereby the rolling elements will be forced radially into the bearing ring to roll an annular groove therein.

4. In a device for forming an annular groove in a bearing ring having coaxial external and internal circular walls, a rotatable chuck for coaxially supporting said ring, a plurality of balls engageable with one of said circular walls, said balls being circumferentially spaced uniformly, guide shoulders on the chuck locating said balls in a plane extending transversely through the bearing ring, a multiple thread feed screw coaxial with said chuck and longitudinally movable through said ring relative to the chuck, each feed screw thread having the same lead and correspondingly tapering longitudinally of the screw, each of said thread respectively receiving one of said balls, and means providing relative rotation between the chuck and the feed screw whereby the uniformly changing diameter of the thread will cause the balls to cooperatively form an annular groove in said bearing ring.

5. In a device for forming an annular groove in a bearing ring having coaxial external and internal circular walls, a rotatable chuck for coaxially supporting said ring, a plurality of circumferentially spaced balls within said ring and engageable with the inner circular wall, annular guide shoulders on the chuck projecting within the ring and locating the balls in a radial plane through said ring, a multiple thread tapering feed screw coaxial with said chuck and axially movable through said bearing ring in radially spaced relation to the bearing ring, said screw having threads respectively receiving said balls, the threads having the same lead and corresponding tapering longitudinally of said screw, and means to provide relative rotation between the chuck and said feed screw whereby the balls will produce a longitudinal feed of the feed screw through said bearing ring and the balls will be radially forced into the bearing ring to form an annular groove therein.

6. In a device for forming an annular groove in a bearing ring having coaxial external and internal circular walls, a rotatable chuck for coaxially supporting and rotating said ring, a series of circumferentially uniformly spaced balls within said ring and engageable with the inner circular wall of the bearing ring, annular guides on the chuck within said ring and positioning the balls with their centers in a plane normal to said ring, a non-rotatable multiple thread feed screw, means supporting said screw for longitudinal movement with its axis coincident with the chuck axis, the threads of said screw respectively receiving and transversely conforming throughout their lengths with the contours of said balls, and each thread having the same lead and correspondingly uniformly increasing in diameter longitudinally of the screw whereby the rotation of said chuck will roll the balls along the threads causing a longitudinal non-rotating feed of said feed screw and forming an annular groove in said bearing ring.

7. In a device for forming an annular groove in a bearing ring having coaxial external and internal circular walls, a rotatable chuck for coaxially supporting and rotating said ring, a series of balls within said ring and engageable with the inner circular wall of the ring, an annular separator rotatable in the chuck and locating said balls in circumferentially uniform spacing, annular guides on the chuck extending within said ring and locating the balls in a plane radially through said ring, a tapering multiple thread screw extending through said ring and movable endwise coaxially of said chuck, said screw having threads corresponding in number to said balls, each thread having throughout its length a transverse curvature matingly conforming to a ball curvature, said threads having the same lead with correspondingly increasing root diameter longitudinally of the screw, and means to rotate the chuck whereby the balls will advance along the increasing thread diameters and roll a groove in said bearing ring.

8. In a device for forming an annular groove in a bearing ring having coaxial external and internal circular walls, a rotatable chuck for coaxially supporting and rotating said ring, a series of balls within said ring and engageable with the inner circular wall of the ring, an annular separator journalled in the chuck and locating the balls in uniform circumferential relation, annular chuck shoulders extending into said ring and positioning the balls in a radial plane through said ring, a longitudinally tapering feed screw extending through the ring and longitudinally movable coincident with the chuck axis, said feed screw having a reduced cylindrical end portion initially received between said balls, multiple threads on said screw extendng from said cylindrical end and corresponding in lead, each thread receiving a ball and uniformly increasing in root diameter from said cylindrical end portion, and means to rotate the chuck and enter said balls respectively into said threads and form an annular groove in said bearing ring.

9. In a device for forming an annular groove in a bearing ring having coaxial external and internal circular walls, a rotatable chuck for coaxially supporting and rotating said ring, a series of balls within said ring and engageable with the linear circular wall of the ring, a rotatable annular separator locating the balls in uniform circumferential spacing annular shoulders on the chuck extending into said ring and locating the balls in a plane normal to and extending through said ring, a longitudinal feed screw extending through the ring and longitudinally movable coincident with the chuck axis, said screw having a reduced cylindrical end, the other end of the screw having a circumferentially extending annular groove, multiple threads on said screw corresponding in number to and respectively receiving said balls, each thread having a transverse curvatures conformingly fitting the ball received therein, the root diameter of each thread blending at one end with said cylindrical end and gradually increasing in diameter and blending with said circumferentially extending groove at the other end, and means to rotate the chuck to feed the balls along the threads to form an annular groove in said ring.

10. The method of forming an annular raceway in the outer race ring of an antifriction bearing comprising the steps of providing a race ring with coaxial outer and inner cylindrical walls, externally supporting the race ring for rotation at a fixed axial position about its axis, providing a cam member with a plurality of spaced longitudinally tapering tracks that extend through said race ring, locating and maintaining a plurality of circumferentially spaced balls of the same size respectively in said tracks against said inner cylindrical wall in a plane extending through said race ring perpendicular to said axis, and providing a relative axial feeding movement between the race ring and the camming member while rotating said race ring, whereby said tapering tracks will radially and uniformly force each ball outwardly into the race ring to roll-form a raceway of desired size within the race ring.

References Cited in the file of this patent

UNITED STATES PATENTS

| | | |
|---|---|---|
| 1,636,808 | Canda | July 26, 1927 |
| 1,746,671 | Munro | Feb. 11, 1930 |
| 2,223,799 | Annen | Dec. 3, 1940 |
| 2,636,397 | Jacubenta | Apr. 28, 1953 |
| 2,719,765 | Menne | Oct. 4, 1955 |
| 2,783,528 | Menne | Mar. 5, 1957 |

FOREIGN PATENTS

| | | |
|---|---|---|
| 552,180 | Great Britain | Mar. 25, 1943 |